Aug. 23, 1927.
B. K. BROWN
1,639,985
DRY CELL DEPOLARIZER
Original Filed July 7, 1925
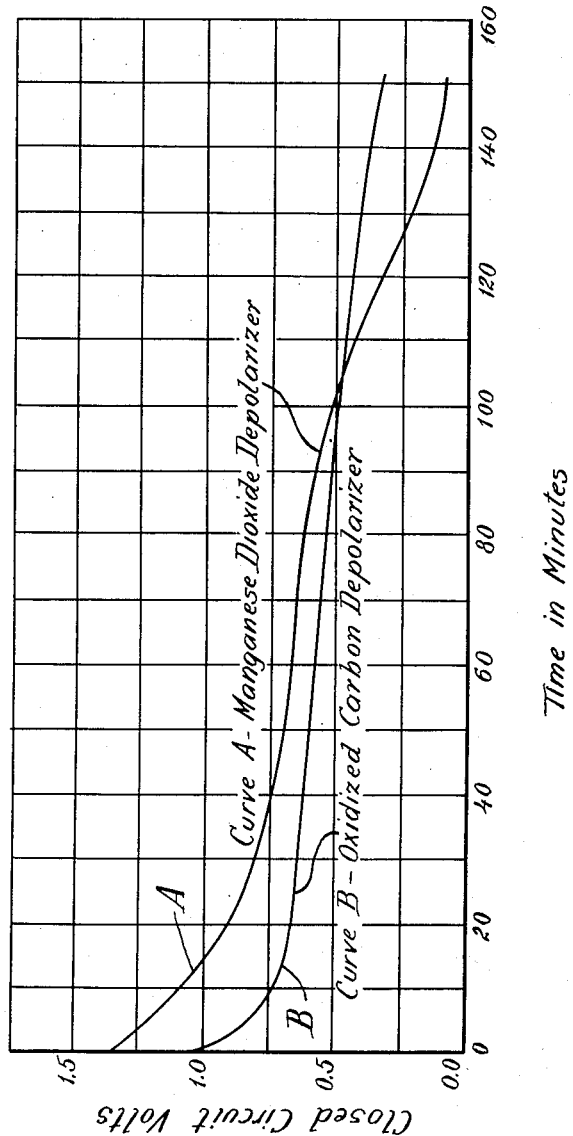
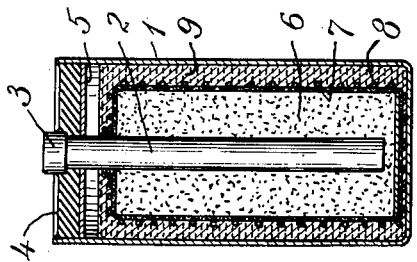
INVENTOR
BRUCE K. BROWN
BY
*Pennie Davis Marvin & Edmonds*
ATTORNEYS Patented Aug. 23, 1927.

1,639,985

UNITED STATES PATENT OFFICE.

BRUCE K. BROWN, OF TERRE HAUTE, INDIANA, ASSIGNOR TO C. F. BURGESS LABORATORIES, INC., OF MADISON, WISCONSIN, A CORPORATION OF DELAWARE.

DRY-CELL DEPOLARIZER.

Original application filed July 7, 1925, Serial No. 42,092. Divided and this application filed July 7, 1926. Serial No. 120,891.

The present invention relates to galvanic cells and more particularly to dry cells of the LeClanche type, wherein a solid depolarizing material is present at one electrode to oxidize the hydrogen there set free.

Dry cells of the LeClanche type as now constructed contain manganese dioxide in one or more of its forms or combinations as the depolarizing material. In a copending application, Serial No. 42,090, filed July 7, 1925, I have claimed a new galvanic cell using an oxide of carbon, such as graphitic oxide, as the depolarizing medium. In the present invention I substitute an oxide of carbon, such as graphitic oxide, which has depolarizing properties, for a portion of the manganese dioxide usually used in dry batteries.

The details of my invention will become clearer from the following description taken in conjunction with the drawings herein:

Fig. 1 is a rectangular elevation of a dry cell, and Fig. 2 shows discharge curves for dry cells when operating under conditions hereinafter set forth in detail.

In the drawing the dry cell comprises a seamless zinc cup (1), which serves as a container for the other elements of the cell. At the center of the cup is a carbon rod (2) provided with a brass cap (3), and held in place by a seal (4) of pitch or sealing wax, poured in while hot and supported on a paper washer (5). Associated with the carbon rod to form therewith the cathode of the cell is a tightly compacted or molded block (6) of depolarizing mixture. This may be enclosed in a cheese cloth envelope (7), wrapped around with a thread (8). A gelatinized electrolyte (9) separates the cathode from the anode, as will be understood by those skilled in the art.

When manganese dioxide is used for depolarizing a dry cell, the discharge curve has certain characteristics as illustrated in curve (A) of Fig. 2, where voltages have been plotted against time in minutes for continuous discharge of a typical cell through a four ohm resistance, the cell being of a size 5/8" in diameter and 1 7/8" tall.

When oxidized carbon is used as the depolarizer the discharge curve has somewhat different characteristics as shown by curve (B) of Fig. 2, being characterized by lower open and closed circuit voltages, a quick drop in voltage to about .65 volt on discharge, and a pronounced flattening of the discharge curve at this voltage. By combining the two depolarizers in various proportions it is possible to modify the discharge curve to suit the requirements.

The oxide of carbon may be made by chemical or by electrochemical oxidation and may be ground in a ball mill or may be left unground and can well be of a fineness of 20 mesh.

A typical "flashlight" mix follows, all parts being by weight: 15 parts oxide of carbon containing 7.85% available oxygen, 15 parts manganese dioxide in the form of pyrolusite, 12 parts of pulverized graphite, which may be of the impalpable fineness described in U. S. Patent No. 1,162,449, 4 parts of sal ammoniac, and a wetting solution. The above mix will have a considerably higher electrical resistance than a mix of the same proportions but of which the 15 parts of oxide of carbon has been ground in a ball mill to crack open the oxidized particles. It is also possible to substitute for the 15 parts of oxide of carbon and 12 parts of pulverized graphite specified in the above formula an oxide of carbon with lower oxygen content and which has been ground to a fine state of subdivision. It is also possible to use an equal amount of artificial manganese dioxide in place of the pyrolusite.

I have further discovered that a highly efficient depolarizing mixture may be made by precipitating an artificial manganese dioxide onto the oxidized carbon particles. I believe that the increased efficiency resulting from this method is due to the actual precipitation of the manganese dioxide in the oxide of carbon, the oxide being colloidal and therefore able to absorb the solutions used for preparing the manganese dioxide. The manganese dioxide may be precipitated by any of the known methods for preparing artificial manganese dioxide. Following is a specification of a typical run which I have found to give excellent results; 1,500 grams of graphite oxidized to contain 4.22 per cent of fixed oxygen (ground or unground) are suspended in the following solution:

450 grams potassium permanganate; 16 liters water; 50 c. c. nitric acid conc.; 425 grams manganese sulphate dissolved in one liter of water. This mixture is agitated occasionally for a 24 hour period after which it is washed, filtered and dried. The yield should be over 1,900 grams of solid.

The above mixture may be used in the following proportions for making a depolarizing mixture for dry cells:

30 parts manganese-treated oxide of carbon; 12 parts impalpable graphite; 4 parts sal ammoniac; the mass being wetted to the usual consistency.

Cores or cathodes are tamped in the usual manner as by aid of a tamping machine, such as is shown in U. S. Letters Patent No. 1,232,297, issued July 3, 1917. The cores are then assembled in a zinc can using a gelatinizable electrolyte to separate the molded electrode from the zinc. Suitable electrolytes are disclosed in U. S. Letters Patents No. 1,292,764, issued January 28, 1919, and No. 1,370,056, issued March 1, 1921. The molded electrode may be provided with a cheese cloth or other bibulous envelope as disclosed in the latter patent or may be left uncovered as disclosed in the earlier patent.

Throughout the specifications and claims carbon and carbonaceous material is used in the broader sense and includes the graphitic state of the element.

This application is a division of my copending application, Serial No. 42,092, filed July 7, 1925.

I claim:

1. The method of making a pure depolarizer which comprises the steps of oxidizing carbonaceous material and then chemically precipitating manganese dioxide onto suspended particles of said oxidized material, substantially as described.

2. The method of making a pure depolarizer which comprises the steps of oxidizing carbonaceous material, suspending the oxidized material in an acidified manganese solution, and slowly precipitating manganese dioxide on the suspended material, substantially as described.

3. The method of making a pure depolarizer which comprises the steps of oxidizing carbonaceous material, suspending the oxidized material in a solution of potassium permanganate and manganese sulphate and precipitating manganese dioxide on said suspended material by means of nitric acid, substantially as described.

In testimony whereof I affix my signature.

BRUCE K. BROWN.